April 7, 1936.                W. ORMSBY                2,036,536
HYDRAULIC APPARATUS, PARTICULARLY FOR VEHICLE BRAKING SYSTEMS
               Filed June 12, 1933        2 Sheets-Sheet 1

INVENTOR
W. Ormsby
By Lacey & Lacey,
Attys

April 7, 1936.  W. ORMSBY  2,036,536
HYDRAULIC APPARATUS, PARTICULARLY FOR VEHICLE BRAKING SYSTEMS
Filed June 12, 1933   2 Sheets-Sheet 2
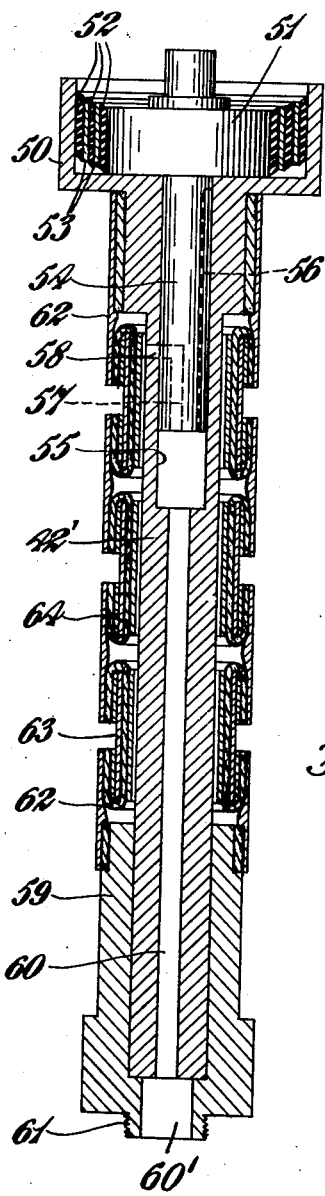
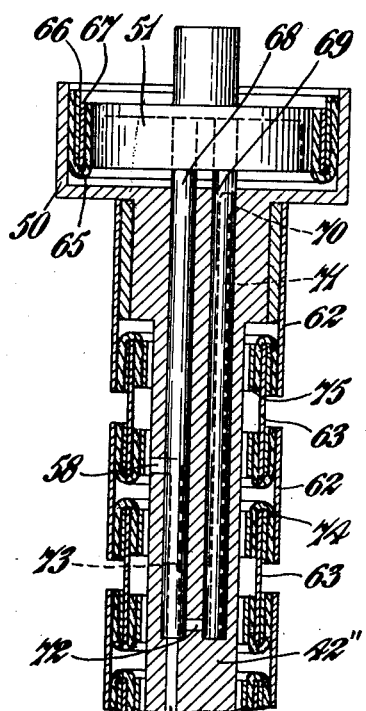
INVENTOR
W. Ormsby
By Lacey & Lacey, Attys.

Patented Apr. 7, 1936

2,036,536

UNITED STATES PATENT OFFICE 2,036,536

HYDRAULIC APPARATUS, PARTICULARLY FOR VEHICLE BRAKING SYSTEMS

William Ormsby, Long Sutton, England

Application June 12, 1933, Serial No. 675,506
In Great Britain June 21, 1932

9 Claims. (Cl. 60—54.6)

This invention relates to hydraulic apparatus more particularly for vehicle braking systems, and it has for its object to provide an improved form of hydraulic cylinder and associated mechanism which is effectual in operation for producing the desired braking action in a motor car or other vehicle, and which, moreover, is especially arranged so that leakage of working fluid is reduced as far as possible.

According to the present invention, there is provided in a hydraulic cylinder of a braking system, a wall or diaphragm of soft flexible material, such as rubber, which forms a fluid tight joint with the cylinder wall or equivalent and which permits the volume of the cylinder space to be changed, the arrangement being such that sliding surfaces past which fluid can leak out of the cylinder space are avoided. The invention further provides a hydraulic cylinder in which the wall defining the cylinder space is composed partly of soft resilient material, such as rubber, arranged for allowing variation in the cylinder space, said wall being at the same time positively sealed over its whole area, i. e. the whole of its interior surface, so as to prevent leakage of fluid. Further, in a hydraulic cylinder of a braking system, having a piston and cylinder, the cylinder space is bounded by a wall composed of soft sheet material, such as rubber, sealed to the cylinder, upon the exterior surface of which sheet the piston is caused to act.

In a hydraulic cylinder of a braking system having a piston or cylinder or equivalent parts which are relatively movable for modifying the cylinder space, according to the invention said piston and cylinder are positively sealed together by means of a pliable member, composed of soft sheet material, such as rubber, the arrangement being such that relative movement of said cylinder and piston brings about a rolling action in the pliable member and thus maintains the cylinder in a fluid tight condition. The barrel forming the cylinder proper may be arranged in a number of telescopic sections, each connected with a pliable member which is arranged to allow relative movement and to provide a permanent fluid seal, while a central plunger conveniently serves to support the sections of the cylinder in alignment and also to carry the working fluid to and from the cylinder space. The movement of the piston or equivalent may, if desired, take place in a plurality of stages, each consecutive stage being arranged to deliver with a given actuating force fluid at a higher pressure than the previous stage, and the pliable member or equivalent may be retained in position against displacement owing to fluid pressure by means of a ring arranged to engage the outer edge of said member, and, if desired, the outer part of a retaining tube. In a hydraulic cylinder having a pliable member connecting a cylinder and piston or equivalent relatively movable parts, said parts may be provided with hard sliding surfaces for affording support, the pliable member being arranged to roll upon itself when such sliding movement takes place, thus maintaining a permanent seal against the leakage of fluid. The invention further provides a hydraulic cylinder arranged to be actuated by the application of pressure fluid, comprising a tubular cylinder, a pliable diaphragm composed of soft material, such as rubber, and a piston arranged to bear upon the exterior of the diaphragm and extend substantially across the whole unsupported area thereof, thus permitting a limited travel of the piston in company with the diaphragm when fluid under pressure is introduced into the cylinder. The cylinder may be or may not be open at both ends, and is provided at the open end with a piston and diaphragm, said piston being arranged to slide upon means serving also to secure the diaphragm in position.

The invention is illustrated by way of example in the accompanying diagrammatic drawings, in which:

Figure 6 is a longitudinal section through a modified form of actuating cylinder arranged for two-stage actuation; and Figure 7 is a view corresponding to Figure 6 showing a further modified form of construction.

Figure 8 is a fragmentary view of the upper portion of Figure 6 with the plunger in extended position.

Figure 1:
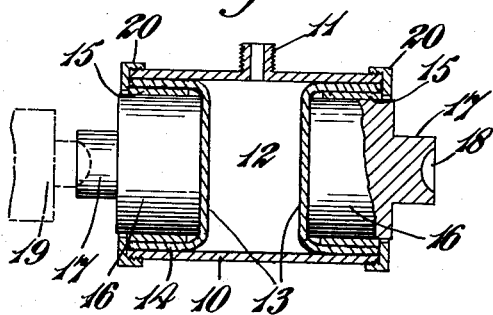
Figure 1 is a sectional elevation through a piston and cylinder arrangement adapted more especially for actuating the shoes of a vehicle brake, the arrangement being in its contracted condition.
Figure 2:
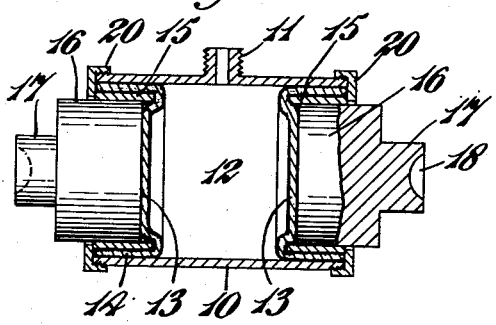
Figure 2 is a view corresponding to Figure 1, the arrangement being in its operative or expanded condition.

In the construction of the brake-operating cylinder illustrated in Figures 1 and 2, an outer tubular cylinder 10 open at each end is provided with a screw connection 11 whereby it may be fed with fluid under pressure from any suitable source, such for instance as an operating cylinder connected to and operated through the medium of the brake pedal (not shown). The end walls of the cylinder space 12 are constituted by pliable members 13 which are formed from flexible sheet material, such as rubber, the peripheral portions being flanged outwardly as at 14, and being pressed firmly into contact with the interior surface of the cylinder 10 by means of retaining tubes 15. The central portions of the pliable members 13 are supported by means of cylindrical pistons 16, and said central portions are arranged to be somewhat slack so that a limited axial movement of the piston 16 is permitted without causing undue stresses in the rubber or equivalent. The axial bosses 17 conveniently formed with recesses 18 are arranged to engage suitable means upon the brake shoes or equivalent, such for instance, as indicated by broken lines at 19 in Figure 1. When fluid under pressure is forced into the cylinder space 12, the pressure exerted upon the pliable members 13 is transmitted to the pistons 16, thus causing the piston to move outwardly as shown in Figure 2. The slackness in the material of the pliable members 13 is preferably sufficient to enable them to assume the positions shown without producing undue stresses in said material. It will be realized that a substantial rolling action takes place in the material adjacent the cylinder walls, while the main stresses are of the compression variety and are substantially uniformly applied. The ends of the cylinder 10 are screw-threaded to receive retaining rings 20 having inwardly directed flanges against which the edges of the pliable members are arranged to bear, and in this way the effect of the internal pressure in the cylinder is to bring about a tendency for the flanged part 14 to thicken, and thus provide an improved seal for preventing the leakage of working fluid.

Figure 3:
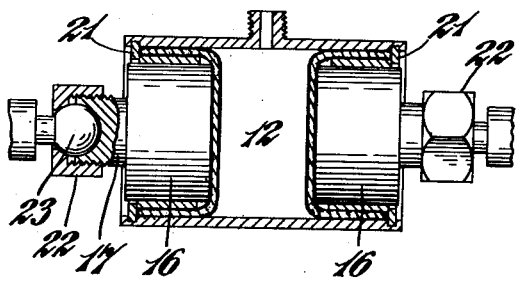
Figure 3 shows a modified form of construction arranged for pushing and pulling during operation.

A modified construction of brake-operating cylinder is shown in Figure 3 in which retaining rings 21 are of split formation, and are inserted into internal grooves formed in the cylinder ends. Further, the bosses 17 are arranged to transmit both pulling and pushing movement, and for this purpose are provided with caps 22 forming socket joints which accommodate balls 23 secured to the brake shoes or equivalent, so that when a negative pressure is induced in the fluid contained in the cylinder space 12, the pistons 16 are forced inwardly by external atmospheric pressure and thus draw the brake shoes away from the usual brake drums.

Figure 4:
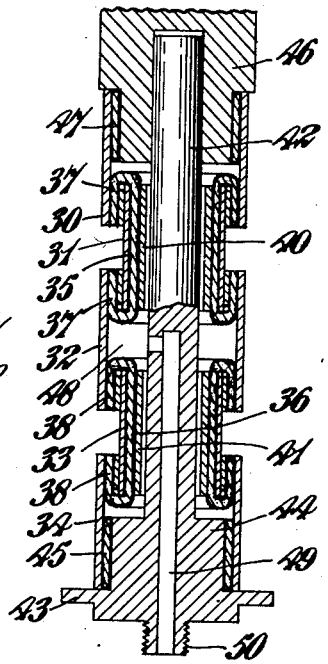
Figure 4 is a longitudinal section through one construction of actuating cylinder.
Figure 5:
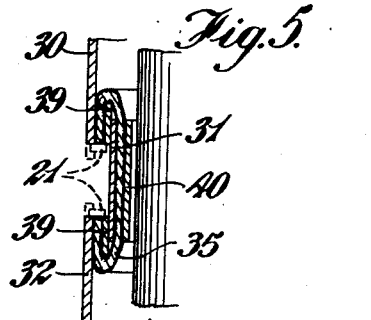
Figure 5 shows to an enlarged scale and in sectional elevation the shape of one of the pliable members when the cylinder space is at its maximum.

The invention may be further applied to the operating cylinders of hydraulic systems, and Figure 4 shows one construction of simple form, such for instance as might be incorporated with the pedal or hand lever of a vehicle brake. In this case an outer cylinder barrel is composed of a number of tubular sections 30, 31, 32, 33 and 34. These are connected together in a fluid tight manner by tubular pliable members 35 and 36 which extend alongside the sections 31 and 33, respectively, and are turned inwardly at their ends as indicated at 37 and 38. These parts which, when initially assembled, assume a position somewhat as shown in Figure 5, are held tightly against the interior walls of the sections 30, 32 and 34 by means of retaining tubes 39, retaining rings 21 being provided, if desired, as indicated in broken lines, and the sections 30 and 32 being extended as shown for their accommodation. The interior surfaces of the retaining tubes 39 slide upon the exterior of the section 31 and so provide a construction which has a smooth action and good wearing properties. Further, inner retaining tubes 40 and 41 may be provided, if desired, for retaining the pliable members relative to the sections 31 and 33. A central plunger 42 serves to retain the sections 32 and 34 in axial alignment, and is provided at its lower end with a fixing flange 43 at the lower end of a cylindrical portion 44 which supports the section 34, an intermediate tube 45 of rubber or the like, or other leak-preventing means, being provided between said portion 44 and the section 34. At its upper end the plunger 42 telescopingly carries a pedal member 46, shown in its depressed position, said member 46 being attached to the section 30 by means of a rubber packing 47. When the member 46 is depressed, the capacity of the cylinder space 48 is diminished, and fluid contained therein is forced under pressure through a duct 49 and thence by way of a union boss 50 to the brake cylinders of the system, which cylinders may conveniently be of the form shown in Figures 1 to 3. A spring (not shown) may conveniently be incorporated in the device for returning the pedal member 46 when the pressure thereon is released, or, alternatively, the springs can be provided in connection with the brake shoes or equivalent, the pedal member 46 being returned by fluid pressure.

The construction of operating cylinder shown in Figure 6 is arranged to act in two stages, and the quantity of fluid in the system is so adjusted that the first or low pressure stage causes a comparatively large quantity of fluid to enter the working spaces of the brake cylinder, thus moving the brake shoes into contact with the drums. Further actuation of the usual pedal or lever causes fluid pressure to be increased, the force upon the pedal or lever remaining the same, so that in this way an extremely large braking effort can be obtained by means of a small lever or pedal and a small travel thereof. In the example given, this is effected by the provision of an auxiliary cylinder 50 provided upon the end of the plunger 42' and fitted with a piston member 51 which itself is actuated by the operating pedal or lever. The exterior of the piston 51 is connected resiliently with the cylinder 50 by means of a plurality of rubber or like tubes 52 interspaced with metal tubes 53 as described in my British Patent No. 348,385, or, alternatively, a method of construction similar to that previously shown in connection with the sections 30 and 31 may be employed, the principal object being to provide a piston connection which is fluid tight, and which, moreover, is of substantially resilient construction so as to respond to the pressure of any fluid which may be trapped in the cylinder 50 when the high pressure part of the stroke is being made. The piston 51 is provided with an axial auxiliary plunger 54 which fits into a bore 55 formed in the plunger 42' and thus serves as a valve for controlling the working flu'd as the action is changed from the first stage to the second. To this end the plunger 54 is formed with a longitudinal groove 56 which extends nearly, but not quite, to the end thereof as shown, while a right-angled passage 57 is arranged to be in register with an opening 58 in the plunger 42' when the piston 51 is completely depressed. The plunger 42' is slidably mounted in a fixed plug or closure 59 and is bored axially at 60 for the passage of fluid from the device, a screw-threaded boss 61 being provided for the accommodation of a pipe union (not shown), the bore 60' of the boss forming a continuation of the bore 60 of the plunger 42' and constituting an outlet. The body of the cylinder is composed of sections, indicated generally at 62 and 63, which are similar in construction to those shown in Figures 4 and 5, tubular pliable members 64 being provided for allowing the relative movement of the sections which takes place when the plunger 42' is moved relative to the plug 59. The cylinder shown in Fig. 6 is in its totally compressed position, and normally the plunger 54 and piston 51 assume a position (Fig. 8) in which the hole 58 is closed and the groove 56 opens into the space within the cylinder 50. When pressure is applied to the piston 51 fluid is expelled from the cylinder 50 by way of the groove 56, and so to the cylinders operating the brake shoes until the latter come into contact with the drums. At this point the piston 51 has reached the end of its travel so shutting off the groove 56 and opening the hole 58, so that further movement of the piston 51 is transmitted to the plunger 42', and this causes fluid under high pressure to pass through the bores 60 and 60' and thence to the brakes. By this means very little overall travel of the brake pedal or lever is required, and at the same time a relatively high final fluid pressure can be attained for producing efficient braking.

If desired, the arrangement shown in Figure 7 can be incorporated in an operating cylinder of the kind shown in Figure 6, since this is especially designed to prevent leakage of oil into the low pressure cylinder 50 during the second stage. It will be realized that if such leakage can take place no advantage with regard to pressure will be obtained, owing to the resistance to inward movement presented by the piston 51. As shown in Figure 7, said piston 51 is sealed by means of an annular pliable member 65 attached to the cylinder 50 and piston 51 by means of relatively slidable retaining tubes 66 and 67 respectively. The piston 51 is provided with a pair of twin plungers 68 and 69 which engage with corresponding bores formed in the main plunger 42'', the plunger 68 being arranged to control the high pressure fluid, while the plunger 69 similarly serves for the low pressure fluid. A hole 70 in the plunger 69 forms the cut-off for the fluid expelled from the cylinder 50, which fluid passes through a bore 71 and thence into the delivery passage 60 by way of a hole 72. The plunger 68 is formed with a right-angle passage 73, and when the piston 51 is in its innermost position this registers with the hole 58 formed in the plunger 42''. It will be realized that by this means, when the end of the first stage is reached, it is very difficult for high pressure fluid to reach the cylinder 50 as there is a double seal upon the hole 72, while a further seal is provided in respect of the hole 70. A modified construction of cylinder body is shown in Figure 7, in which the sections 62 and 63 are coupled by independent pliable members 74 which are in the form of rings having substantially U-shaped cross-sections, independent retaining tubes 75 being employed.

It will be understood that the construction of piston and cylinder according to the invention may be embodied in a number of different designs arranged to suit particular circumstances, and, if desired, such pistons and cylinders can be provided with valves of known type, such, for instance, as plate valves or plug cocks for controlling the flow of pressure fluid. Moreover, springs may be provided when required for returning the piston and/or the cylinder to a predetermined position, while means may be arranged whereby the quantity of fluid existing in the system can be adjusted to suit the movement required for operating the various parts of said system.

The invention provides an efficient construction of apparatus for hydraulic braking systems in which the maximum efficiency is obtained due to the provision of means for supplying appropriate fluid pressures, and also means for preventing the leakage of working fluid past sliding surfaces, while the pump action is improved owing to the fact that the rubber or equivalent washers or rings increase in thickness as the plunger moves inwardly, thus diminishing the effective cross-sectional area and automatically increasing the intensity of fluid pressure. This expansive effect may also be employed to block one or more of the oil passages during operation and so act as valves.

What I claim is:—

1. In a hydraulic mechanism including a cylinder and an element movable longitudinally therein, a sealing structure including a flexible element covering the end of the movable element and having an annular marginal portion forming a bight with the main portion and fitting closely against the inner surface of the cylinder, and an annular retaining member fitting snugly within the bight of said marginal portion and exerting radial pressure to securely hold the flexible element in fixed liquid-tight relation to the cylinder, said flexible element rolling or retroflexing upon the edge of said retaining member during operation of the mechanism and the free portion of the flexible element being of sufficient superficial area to permit operation of the device without stretching the said flexible element.

2. In a hydraulic mechanism including a cylinder and an element movable longitudinally therein, a sealing structure including a flexible element covering the end of the movable element and having a cylindrical marginal portion forming a bight with the main portion and fitting closely to the inner surface of the cylinder, and a retaining ring fitting snugly within the bight of said marginal portion and coextensive therewith whereby to hold the entire area thereof in fixed liquid-tight relation to the cylinder, the free portion of said flexible element being of sufficient superficial area to extend from a position within one end portion of the retainer ring to a position beyond the said end of the ring without stretching the flexible element.

3. A hydraulic mechanism including a cylinder consisting of a plurality of axially alined sections, flexible sealing elements having their opposite ends disposed axially in opposed ends of adjacent cylinder sections and provided with reflex annular margins forming bights with their main portions and fitting closely against the inner surface of the respective cylinder sections, and retaining rings fitting snugly within the bight of said reflex margins to maintain them in fixed liquid-tight relation to the respective cylinder sections.

4. A hydraulic mechanism including a cylinder consisting of a plurality of axially alined sections, flexible sealing elements having their ends disposed within the opposed ends of adjacent cylinder sections and provided with reflex margins fitting closely against the inner surface of the respective cylinder sections, a retaining ring fitting snugly within said reflex margins to maintain them in fixed liquid-tight relation to the cylinder sections, and a sleeve having its opposite ends engaged slidably within the opposed retaining rings and its intermediate portion supporting the intermediate portion of the flexible sealing element.

5. Hydraulic mechanism comprising a cylinder consisting of axially alined sections, flexible sealing members having outer annular marginal portions forming bights with their main portions and fitting closely within opposed ends of the alined sections, retaining rings fitting snugly within the bights of said margins to hold them in fixed liquid-tight relation to the respective cylinder sections, and a sleeve having its ends fitting telescopically within the retaining rings and supporting the inner portions of the sealing members.

6. Hydraulic mechanism comprising a cylinder consisting of axially alined sections, flexible sealing members having outer marginal portions fitting closely within opposed ends of the alined sections, retaining rings fitting snugly within said margins to hold them in fixed liquid-tight relation to the cylinder sections, a sleeve having its ends fitting telescopically within the retaining rings and supporting the inner portions of the sealing members, and inner annular members engaging the sealing members and holding them to the sleeves.

7. A hydraulic mechanism including a cylinder composed of coaxial telescopic sections, flexible sealing members fixed in the meeting ends of adjacent sections, annular members supporting the inner portions of said sealing members, closures for the end sections sealed therein, and a plunger carried by one closure and movable in the other closure and extending axially through all the cylinder sections, there being a passage for pressure fluid in the plunger and corresponding closure.

8. A hydraulic mechanism including a cylinder composed of coaxial telescopic sections, flexible sealing members connecting adjacent sections, closures for the end sections sealed therein, one of said closures having an outlet passage and a bore from which said passage leads, a plunger carried by the other closure within the cylinder and having a bore therethrough and movable in the bore of the closure having the outlet passage, and a radial opening leading into the cylinder, an auxiliary cylinder on said other closure, a piston in the auxiliary cylinder, and a plunger extending from said piston to work in the bore of the first-mentioned plunger, said last-mentioned plunger having a groove in one side to establish communication between the auxiliary cylinder and the bore of the first-mentioned plunger and an angular bore adapted to establish communication between the bore of the first-mentioned plunger and the radial opening in the side thereof.

9. A hydraulic mechanism including a cylinder composed of coaxial telescopic sections, flexible sealing members connecting adjacent sections, closures for the end sections sealed therein, one of said closures having an outlet passage and a bore from which said passage leads, a plunger carried by the other closure within the cylinder and having a plurality of bores, a transverse port connecting said bores and a radial opening leading from one of said bores into the cylinder, said plunger being movable in the bore of the first-mentioned closure and the last-mentioned bore of the plunger communicating with the bore of said closure, an auxiliary cylinder on said other closure, a piston in the auxiliary cylinder, and a plurality of plungers extending from said piston to work in the bores of the first-mentioned plunger, one of said last-mentioned plungers having a passage to establish communication between the auxiliary cylinder and a bore of the first-mentioned plunger and the other of said last-mentioned plungers having an angular bore to establish communication between the first-mentioned plunger and the first-mentioned cylinder.

WILLIAM ORMSBY.